United States Patent [19]

Taber et al.

[11] 4,433,424

[45] Feb. 21, 1984

[54] MULTICHANNEL COMMON CLOCK

[75] Inventors: Louis Taber; Don G. East, both of Tucson, Ariz.

[73] Assignee: International Business Machines Corporation, Armonk, N.Y.

[21] Appl. No.: 262,719

[22] Filed: May 11, 1981

[51] Int. Cl.³ .............................................. H04L 7/02
[52] U.S. Cl. ...................................... 375/106; 371/61; 360/51
[58] Field of Search ................ 375/106, 110, 118–120, 375/38; 370/100, 103, 19, 21; 360/51; 328/39, 328/63, 72; 371/5, 61

[56] References Cited

U.S. PATENT DOCUMENTS

| 3,036,157 | 5/1962 | Franco | 375/120 |
|---|---|---|---|
| 3,204,035 | 8/1965 | Ballard | 370/21 |
| 3,238,462 | 3/1966 | Ballard et al. | 328/72 |
| 3,787,665 | 1/1974 | Watson et al. | 370/103 |
| 3,859,466 | 1/1975 | Hartmann | 370/103 |
| 4,002,839 | 1/1977 | Karl et al. | 370/103 |
| 4,074,080 | 2/1978 | Dragotinov et al. | 370/103 |
| 4,144,448 | 3/1979 | Pisciotta et al. | 371/61 |

Primary Examiner—Robert L. Griffin
Assistant Examiner—Stephen Chin
Attorney, Agent, or Firm—James M. Thomson

[57] ABSTRACT

A clocking system is disclosed for a multichannel data transmission system which includes a temporary storage medium, such as magnetic tape. The system is an improvement over prior art systems which utilize a separate phase locked loop clock correction circuit for each channel. The described system utilizes a single clock for the multiple channels which operates at a frequency F that is an integral multiple of the channel baud rate. Means are provided to continually monitor the phase error of each channel and a composite correction signal is derived and applied to the clock signal which is proportional to the average of the phase errors of the individual channels.

9 Claims, 3 Drawing Figures

MULTICHANNEL COMMON CLOCK

BACKGROUND OF THE INVENTION

1. Field of the Invention

The present invention relates to a clocking system for a multichannel data transmission system which may include a temporary storage medium, such as magnetic tape. More particularly, the invention relates to an improved clocking system which utilizes a single clock for the multiple channels, rather than a separate phase locked loop clock regeneration circuit for each channel. The single clock signal operates at a frequency F that is an integral multiple of the channel baud rate. Means are provided to continually monitor the phase error of each channel, and a correction signal is derived and applied to the clock signal which is proportional to the average of the phase errors of the individual channels.

2. Description of the Prior Art

In self-clocking data transmission systems which may include temporary storage medium, the function of the read electronics is to extract both data and clock signals from the read signal. Such multichannel, high-density recording systems have heretofore used a separate phase locked loop for each track to extract the necessary timing information from the read signal. This results in fairly complex clock the detect circuitry that represents a significant cost with respect to such systems.

U.S. Pat. No. 3,452,294 to Mumford, et al. describes a system providing rate synchronization of a network of digital stations. In the system, each station has its own oscillator and the oscillators are maintained in synchronism with each other by comparing the oscillator at a given station repeatedly with the oscillators at each of the other stations. A unit is added to the compared oscillator signal for each other oscillator found to have a higher frequency and a unit is subtracted for each oscillator which is found to have a lower frequency. Accordingly, the system attains some measure of synchronism.

U.S. Pat. No. 3,128,430 describes a phase shifting system for phased antenna arrays. However, the patent fails to disclose any means to correct or modify the phase relationships between the various arrays.

U.S. Pat. No. 4,013,962 describes a receiver selecting voting system in which the lowset noise audio signal produced by a number of different radio receivers is selected and coupled to a monitoring speaker. Each receiver obtains signals from a transmitter and produces either corresponding audio signals or squelch indicating status tones which are transmitted to a voting control center. The voting control center selects the unsquelched receiver audio signal having the lowest noise level and couples the signal to a monitoring speaker.

None of these patents discloses a suitable technique for replacing a multiplicity of clock signals with a single clock signal which is corrected to reflect the average phase displacement of multiple channels whereby digital data can be suitably recovered.

SUMMARY OF THE INVENTION

Accordingly, it is an object of the invention to provide a unique clocking system for a multichannel data transmission system which utilizes a single clock for the multiple channels that is controlled by a correction signal which is a function of the combined phase errors of the individual channels of the system.

This object and other features and advantages of the invention are obtained in a multichannel data transmission system which utilizes a temporary storage medium, such as magnetic tape. The system includes a single clock for the multiple channels which operates at a frequency F that is an integral multiple of the channel baud rate. Each channel includes a peak detector and a digital data detector which continually monitors the phase error of the channel and develops a correction signal proportional thereto. The correction signals are applied to a summation circuit comprised of an updown counter whereby a clock correction signal is derived and applied to the clock that is proportional to the average of the phase errors of the individual channels.

DESCRIPTION OF THE DRAWINGS

Other features and advantages of the invention will become apparent from the following detailed description taken in conjunction with the drawings, wherein.

DETAILED DESCRIPTION OF THE INVENTION

Figure 1:
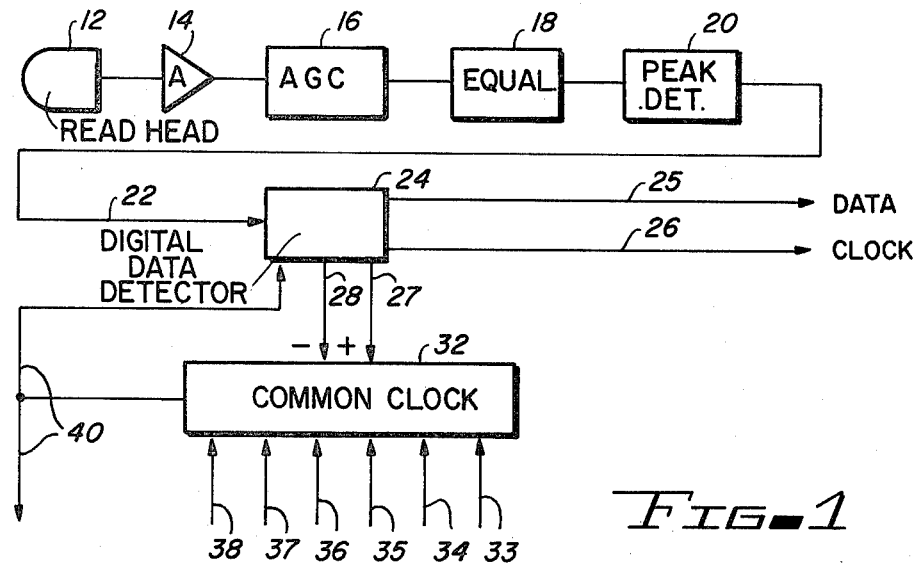
FIG. 1 comprises a schematic diagram of a preferred embodiment of the invention.

Referring now to the drawings and particularly to FIG. 1, a schematic representation of one channel of a multichannel data transmission system including magnetic tape storage means is represented. The system includes many aspects of the usual analog data channel. Thus, a storage means such as disk or tape (not shown) is included for which a read head 12 is provided of conventional design. In addition, a preamplifier 14, an automatic gain control circuit 16, and an equalizer 18, all of conventional design, are utilized. Finally, a peak detector 20 is utilized in the usual fashion to produce an NRZI signal.

A digital data detector 24 is illustrated which receives an input from peak detector 20 and provides a data output signal on conductor 25, as well as a clock signal on conductor 26. In this regard, the digital data detector performs one usual function of a phase locked loop circuit in a prior art system i.e., to extract both data and clock signals from the read signal.

Figure 2:
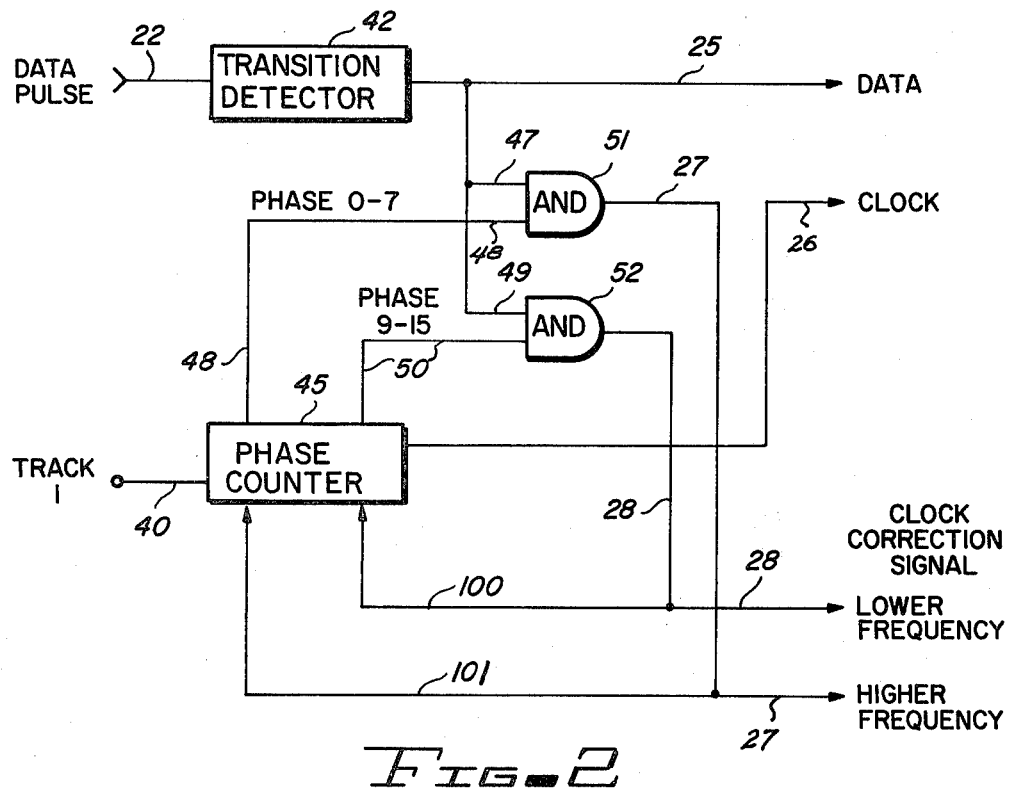
FIG. 2 shows a more detailed schematic of the digital data detector of FIG. 1.

To further accomplish this function, the digital data detector circuit, which is described in more detail with respect to FIG. 2, provides Track 1 clock correction signals to initiate an increase or decrease in frequency of a global common clock circuit 32 via conductors 27, 28, respectively. The global common clock also receives similar track clock correction input signals from the other tracks of the system, as illustrated, on conductors 33–38, etc., for example. The global common clock operates at a frequency F that is an integral multiple of the channel baud rate. In the present instance, the global common clock operates at a frequency 15 times the baud rate. The output of the global common clock is supplied to the digital data detector of each track on a conductor, such as conductor 40 in FIG. 1.

Means are provided as described in more detail in connection with FIG. 2 and FIG. 3 for developing a correction global common clock signal by means of applying in the global common clock circuitry, a correction signal which is proportional to the average of the phase errors of the individual channels, as determined by the digital data detector for each channel.

Referring to FIG. 2, the components of the digital data detector are illustrated in more detail. A data signal from peak detector 20 of FIG. 1 is received via conductor 22 as an input to the digital data detector. More particularly, the data pulse from detector 20 is an input signal to a transition detector 42. The transition detector is of conventional design and provides an output signal on data conductor 25 which comprises a data signal to be evaluated by the channel circuitry in well-known fashion. Transition detector 42 also provides, respectively, on conductors 47, 49 output signals corresponding to each transition of the data. The transition signals are provided as one input to each of a pair of AND gates 51, 52 associated with the phase counter. The phase counter receives as an input a Track 1 clock signal from the global common clock via conductor 40. The Track 1 clock signal is at a frequency of 15 times the data signal on conductor 22. Phase counter 45 provides an output signal on conductor 48 to AND gate 51 which also receives an input via conductors 25, 47 from the transition detector. In similar fashion, the phase counter provides an output signal on conductor 50 which serves as an input to AND gate 52. AND gate 52 also receives an input from the transition detector via conductors 25, 49.

The phase counter and transition detector cooperate with gates 51, 52 to determine when a phase error exists between data pulse signals on conductor 22 and corresponding data signals in the Track 1 clock. Thus, each phase interval of a data pulse is effectively divided into 15 increments by the Track 1 clock signal input to the phase counter. The phase counter provides an output signal to gate 51 for the first seven counts of the clock signal. In the event that transition detector 42 detects a transition representing the peak of a data signal during any of the first seven increments, it provides a positive input to gate 51 which then will provide a positive signal on conductor 27 comprising a clock correction signal and a positive signal on conductor 101 to suppress one state of the phase counter.

By the same token, the phase counter provides an output signal on conductor 50 for each of the increments 9-15 of a given phase cycle. In the event transition detector 42 identifies a peak corresponding to any of increments 9-15, then a positive signal output is received from gate 52 on conductor 28 comprising a clock correction signal of negative phase. A positive signal is then provided on conductor 100 to control the phase counter state.

In the event that the transition detector detects a data peak at increment 8, no correction signal is derived and the phase count is unaltered.

The phase counter also provides an output comprising a corrected clock signal on conductor 26.

Figure 3:
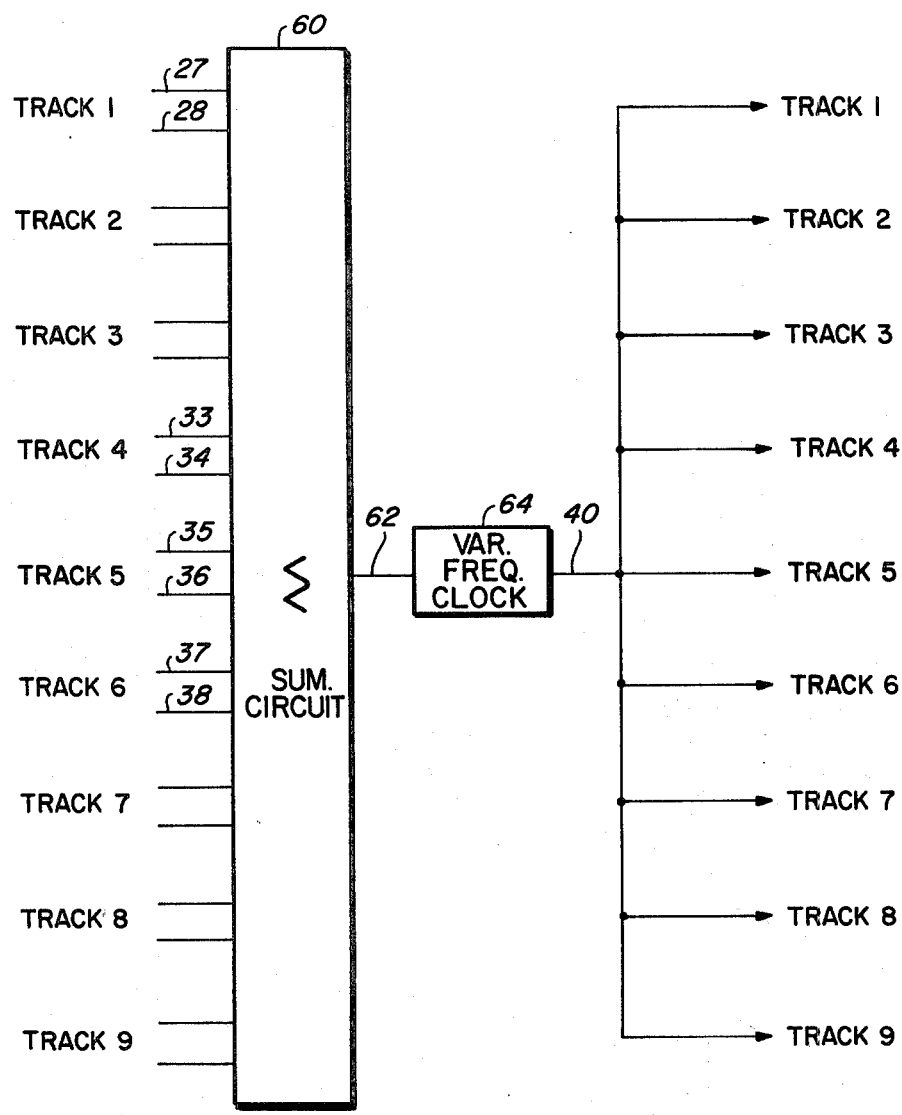
FIG. 3 shows a more detailed schematic of the global common clock of FIG. 1.

Referring now to FIG. 3, the components of the global common clock are described in more detail. The global common clock includes a summation circuit 60 adapted to receive as inputs all of the paired clock correction signals from the respective tracks of the multichannel system. In the particular embodiment, nine paired clock correction signals are indicated, corresponding to the nine tracks of the system. However, it should be recognized that other track configurations could be utilized as well.

The summation circuit 60 comprises a conventional updown counter. Accordingly, the counter counts in one direction, i.e., up in response to each input it receives from any track on a positive input line, and it decrements or counts down with respect to a given count upon receipt of each input on a negative input line. Consequently, the output of summation circuit 60 on conductor 62 comprises a control signal for variable frequency clock 64 which reflects whether the average phase error on all of the channels of the system is positive or negative. The variable frequency clock provides an output signal on conductor 40 which comprises a track clock signal supplied to each track of the system, as illustrated in FIGS. 1 and 2, for example.

It should be recognized that other arrangements could be utilized within the scope of the present invention. For example, the phase counter could be utilized to provide a weighted indicated as to the degree of phase displacement of the data pulse with respect to the center of the phase interval. Alternatively, a weighted system could be utilized, wherein the displacement of the outer tracks, which are less accurate than the inner tracks of the tape system, could be given less weight in developing a correction system. The inner track displacements could be given twice the importance of outer track displacements, for example. Both of these alternatives could be accomplished through the use of conventional logic circuitry within the digital data detector without further invention.

Also, it should be apparent that the system described is a nine-track system; and that multiple track systems of fewer or more than nine tracks could be utilized as well, if desired. The use of a clock frequency of 15 times the data is a convenient integral number of the baud rate. However, it should be recognized that this number could be varied as well. The analysis of current and future technology leads the inventors herein to conclude that a clock rate of 5 times the data frequency is fairly convenient and that the clock rate of 15 times data frequency is about the current upper range of convenience as far as design is concerned. However, it should be apparent that a clock frequency of 3 times the data rate would be functional, and that, depending upon the parameters of available LSI components, a clock frequency above 15 times the data rate might be successfully utilized, although these parameters are currently less desirable than the 5 to 15 range.

While the invention has been particularly shown and described with reference to preferred embodiments thereof, it will be understood by those skilled in the art that various changes in form and details may be made therein without departing from the spirit and scope of the invention.

What is claimed is:

1. In a data transmission system wherein data is transmitted to or from magnetic storage means on multiple parallel channels in the absence of a synchronizing channel, with single source clocking information incorporated with data on each channel,
variable frequency clocking means operative at a clocking rate which is an integral multiple of the channel signal baud rate,
means for supplying signals from said clocking means to each individual channel subsystem,
means associated with the clocking means and each channel operable at the bit rate or any subharmonic of the bit rate for monitoring the phase error of each channel of the system with respect to said clocking signals, and means for applying a clock correction signal to said variable frequency clocking means which is a function of the phase errors of all the data channels of the system, whereby data transmitted under single-source clocking control can be resynchronized for further processing by utilizing a single clock for the multiple channel.

2. The system of claim 1 wherein the means for monitoring the phase error includes a peak detector adapted to receive channel data signals, phase counting means adapted to receive said clocked signals, and logic means responsive to the output of the peak detector and the phase counter to produce clock correction signals which represent the positive or negative phase error of the channel with respect to the clock signal.

3. The system of claim 2 wherein the variable frequency clocking means include a variable frequency clock and a summation circuit adapted to receive phase error signals from each of the channels and provide a single output which is a function of the phase errors of all of the channels.

4. The system of claim 3 wherein the clocking rate of the variable frequency clocking means is in a range of 5-15 times the channel baud rate.

5. The system of claim 4 wherein the clocking rate is 15 times the channel baud rate.

6. The system of claim 4 wherein 9 channels are utilized.

7. The system of claim 4 wherein more than 9 channels are utilized.

8. The system of claim 4 wherein the phase error of each individual channel is given equal value in the summation circuit.

9. The system of claim 4 wherein the phase error signal from individual channels are given unequal value in the summation circuit.

* * * * *